United States Patent [19]

Deinlein-Kalb et al.

[11] Patent Number: 4,955,450
[45] Date of Patent: Sep. 11, 1990

[54] LIFTING DEVICE FOR MOTOR VEHICLES

[76] Inventors: Hans Deinlein-Kalb, Georg-Stefan-Str. 31; Monika Festl, Georg-Stafan-Str. 35a, both of D-8500 Nürnberg 60, Fed. Rep. of Germany

[21] Appl. No.: 272,832
[22] PCT Filed: Apr. 10, 1987
[86] PCT No.: PCT/EP87/00196
§ 371 Date: Oct. 6, 1988
§ 102(e) Date: Oct. 6, 1988
[87] PCT Pub. No.: WO87/06548
PCT Pub. Date: Nov. 5, 1987

[30] Foreign Application Priority Data

Apr. 22, 1986 [DE] Fed. Rep. of Germany ....... 3613495

[51] Int. Cl.⁵ .............................................. B60S 9/00
[52] U.S. Cl. ................ 180/199; 280/763.1; 254/122
[58] Field of Search ............... 180/199, 200, 201, 202, 180/203; 280/767, 761, 763, 43.23; 254/423, 418, 420, 224, 124, 122, 89 R, 89 H, 90, 91, 92

[56] References Cited

U.S. PATENT DOCUMENTS

| 2,937,852 | 5/1960 | Clarke | 254/122 |
| 3,246,709 | 4/1966 | Lossev | 180/200 |
| 3,997,143 | 12/1976 | Rose | 254/122 |

FOREIGN PATENT DOCUMENTS

| 0275494 | 7/1988 | European Pat. Off. | 254/122 |
| 3538568 | 5/1987 | Fed. Rep. of Germany | 254/89 R |
| 3629305 | 3/1988 | Fed. Rep. of Germany | 254/89 R |
| 1022432 | 3/1953 | France |  |
| 0532084 | 1/1958 | Italy | 254/423 |
| 1408528 | 5/1973 | United Kingdom | 254/122 |

Primary Examiner—Charles A. Marmor
Assistant Examiner—Victor E. Johnson
Attorney, Agent, or Firm—Sughrue, Mion, Zinn, Macpeak and Seas

[57] ABSTRACT

Lifting equipment 4 for turning a four-wheeled vehicle on the spot to facilitate maneuvering, which equipment can be driven mechanically, pneumatically, hydraulically or electrically, is arranged at the underside of the vehicle and comprises a spindle-driven jack with a ground-engaging member 22. The jack is so positioned that the supporting moment provided by the member acts on the vehicle longitudinal centre line but is offset relative to the vehicle centre of gravity 3. The offset is such, in the case of a vehicle with front wheel or four wheel drive, that the rear wheels are lifted off the ground and the jack carries 60 to 80% of the vehicle weight, the partially relieved front wheels carrying the rest of the weight. Transmission of drive to the turned front wheels in this state results in the pivoting of the vehicle about the member, with the driven front wheels spinning or slipping against the roadway.

9 Claims, 2 Drawing Sheets ated centre 3. Thereby, when the lifting equipment 4 is extended, the left hand wheel pair 61 and 71 or the right hand wheel pair 62 and 72 is each time partially or wholly relieved in longitudinally parallel arrangement.

LIFTING DEVICE FOR MOTOR VEHICLES

BACKGROUND OF THE INVENTION

The invention concerns a lifting equipment with mechanical, pneumatic, hydraulic or electrical drive for four-wheeled motor vehicles.

The inadequate mobility of passenger motor vehicles when moving into and out of parking places, in emergency situations and accidents as well as in the case of the daily traffic jams on all highways is sufficiently well known. A change in the direction of travel or the moving into and out of parking places in vehicle queues frequently require repeated shunting with the danger of a collision with other vehicles. The cause of this is substantially the large turning circles of the passenger motor vehicles, which does not permit a turning in the smallest space.

In the GB-A No. 380048 (Evans), there is described a lifting equipment which is firmly mounted at the vehicle base and which on corresponding arrangement lifts either the front wheels or the rear wheels of the vehicle, wherein a small roller loaded by the vehicle weight bears against the roadway and shall at the same time serve as transverse drive. Apart from the expensive mechanism with manual operation, it can be stated that it is almost impossible to move a vehicle weighing several tons, for example on a cobble-stone surface, by means of a roller and to turn the vehicle about the front and rear axle. It must furthermore be regarded as impossible to pivot the vehicle about the vertical axis on the spot when one wheel pair each time still has adhesion with the roadway. Already by reason of the fact that the vehicle is for example raised by both front wheels off from the roadway, it can be stated that a pivotation of the vehicle about a vertical axis is neither intended nor performable. The printed specification also contains no statements about whether the vehicle shall or can be pivoted with the own travel drive.

SUMMARY OF THE INVENTION

The invention is therefore based on the task of creating an equipment which eliminates the mentioned defects and increases the mobility of passenger motor vehicles in the narrowest space. Furthermore, the equipment shall be uncomplicated also for the layman and operationally reliable for the driver and the equipment shall finally be installed cheaply in new and second-hand vehicles.

For the solution of the problem, the invention starts out from a lifting equipment for the turning on the spot of a four-wheeled motor vehicle with front-wheel or four-wheel drive, wherein the lifting equipment is provided with mechanical, pneumatic, hydraulic or electrical drive and firmly mounted at the lower load-supporting base or frame of the vehicle and on actuation bears against the roadway in such a manner that two or three vehicle wheels are each time lifted off from the roadway by a supporting moment. The invention consists in that the supporting moment of the lifting equipment engages in such a manner off the centre of gravity and longitudinally centrally of the vehicle that the two rear wheels are raised off from the roadway and both the front drive wheels are partially relieved in such a manner that the lifting equipment is loaded by 60% to 80% of the vehicle weight and the partially relieved front wheels are loaded by the remaining load.

In refinement of the invention, the lock of the front differential gear is switchable on and off directly or indirectly automatically by the lifting equipment mechanically, pneumatically, hydraulically or electromechanically.

Preferably, the lifting equipment consists of two transverse carriers, which are fastened at the base of the vehicle and each consist of a laterally open right-angled profile and two scissors arm pairs, which are each borne at their outer ends to be rollable within the transverse carriers by rotatable rollers and to be pivotable at the rollers, whilst the inner ends of the scissors arm pairs, which together point towards the centre, are pivotably borne at a bottom plate to be placed on the base.

In further refinement of the invention, the lifting equipment in the extended state is supported against the vehicle frame by stays.

Advantageously, the lifting equipment is latchable automatically and unlatchable only by a full turn of the front wheels to the left or right. The latching or unlatching of the lifting equipment can take place through limit switches at the steering linkage.

It is furthermore possible that equipment is actuable directly or indirectly by the lifting equipment for the limitation of the stroke of all wheels.

BRIEF DESCRIPTION OF THE DRAWINGS

An example of embodiment of the invention is reproduced in the drawings. There show.

DETAILED DESCRIPTION OF THE PREFERRED EMBODIMENTS

Figure 1:
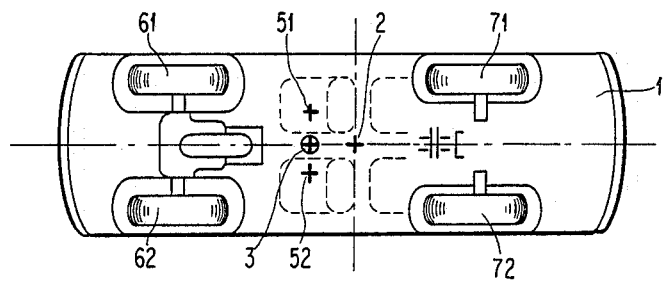
FIG. 1 the view of a vehicle base with drawn-in gravitational centre and three possible load engagement points, FIG. 2 a plan view onto the lifting equipment without drive motor from the direction of the arrow II of FIG. 3, FIG. 3 a section through the lifting equipment without drive motor along the line 111—III of FIG. 2, FIG. 4 a section as in FIG. 3 through the lifting equipment with drive motor, FIG. 5 the view of the vehicle base with built-on lifting equipment and FIG. 6 a wheel suspension with a ratchet equipment for stroke limitation.

The view of the vehicle base of a motor vehicle 1 is reproduced in FIG. 1. When the force, which acts at the driving wheels 61 and 62 of a motor vehicle, multiplied by the frictional co-efficient of the tires with the roadway, is smaller than an oppositely acting restoring force in the form of braking or adhesion moments, then the motor vehicle 1 cannot move from the spot. The invention makes use of this technical fact in that the vehicle 1 is supported against the roadway by 60% to 80% of the vehicle weight by a lifting equipment 4 mounted at the vehicle base and described in the FIGS. 2 to 5. In the case of front wheel drive or all-wheel drive vehicles, the engagement point 2 of the lifting equipment 4 preferably lies behind the gravitational centre 3 of the vehicle. In the case of vehicles, which are driven by way of the rear wheels 71 and 72, the lifting equipment 4 is arranged at the support points 51 or 52 parallelly to the longitudinal axis of the vehicle and beside the gravi- For the drive to turn the vehicle 1 about the rotational centre of the lifting equipment 4, it is here required to lock the differential in rear wheel drive. This expediently takes place likewise automatically by the lifting equipment 4 in that a mechanical system or pneumatic, hydraulic or electrical servomotors are driven.

Figure 2:
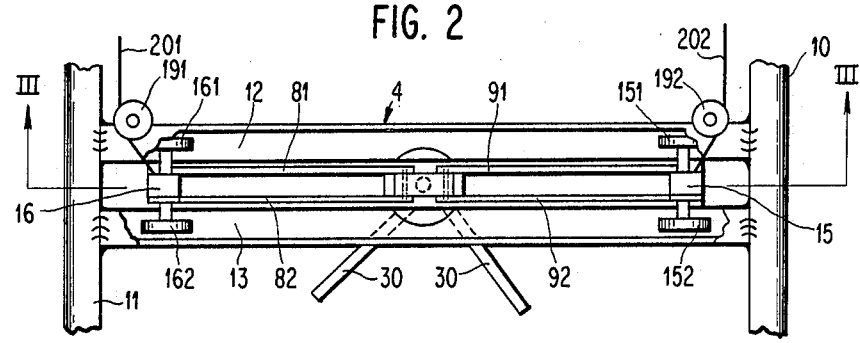
Figure 3:
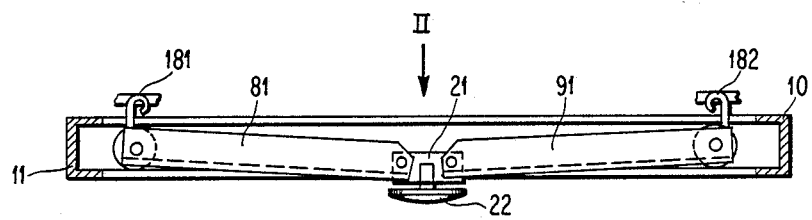

A plan view onto the lifting equipment 4 from the direction of the arrow II of FIG. 3 is reproduced in FIG. 2 and a section through the lifting equipment 4 along the line III—III of FIG. 2 is reproduced in FIG. 3. In the illustration of the FIGS. 2 and 3, the lifting equipment 4 is disposed in the retracted state. The lifting equipment 4 consists of two longitudinal carriers 10 and 11, two transverse carriers 12 and 13 firmly connected with the longitudinal carriers 10 and 11 and two scissors arm pairs 81, 82 and 91, 92, which are each rollably and pivotably suspended at their outer ends by rotatable rollers 151, 152 and 161, 162 within the U-profile of the transverse carriers 12 and 13, whilst the ends of the scissors arm pairs 81, 82 and 91, 92, which together point towards the centre, are articulatedly connected with a bottom plate 21. A turn-table 22 is borne pointing perpendicularly downwards in the bottom plate 21 and borne to be rotatable in the bottom plate 21 to be pendulating in all directions and, above all, with low friction. For better illustration of the build-up of the pivoting equipment 4, the upper limbs of the U-shaped carriers 12 and 13 are drawn broken away in FIG. 2 so that the scissors arm pairs 81, 82 and 91, 92 with the associated rollers 151, 152 and 161, 162 are visible.

Figure 6:
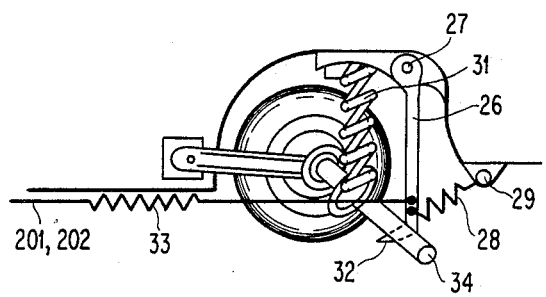

Two hooks 181 and 182, which are each firmly connected with respective outer ends of the scissors arm pairs 81, 82 and 91, 92, serve for the fastening and for the stroke actuation of a respective cable 201 and 202, which lead by way of guiding rollers 191 and 192 to the wheel suspension illustrated in FIG. 6.

Figure 4:
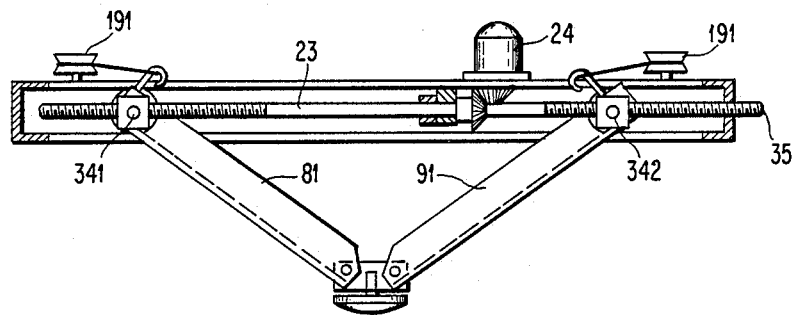

In the example of embodiment according to FIG. 4, the pivot arms 81 and 82 are stroke-actuated in that a hydraulic, pneumatic or electrical motor 24, driven from the battery of the vehicle 1, a threaded spindle 23 with a left-hand/right-hand thread are set into rotary motion and the scissors arm pairs 81, 82 and 91, 92 are stroke-actuated inwardly by way of the pivot nuts 341 and 342 of the outer roller bearings 151, 152 and 161, 162, which leads to a scissors movement of the scissors arm pairs 81, 82 and 91, 92 and thereby to the vertical stroke of the bottom plate 21 with the turn-table 22. Conversely, through driving of the motor 24 during travel operation, the lifting equipment 4 can again be retracted into the rest position according to FIG. 3. The threaded spindle 23 can be provided with a square spigot 35 for the emergency operation by means of hand crank.

When the vehicle 1 is to be pivoted out of a stopping or parking position, then the steering of the front driving wheels 61 and 62 must be turned fully to the left or fully to the right according to the intended pivotal direction. Only then will limit switches, which are not reproduced in the drawings, at the steering linkage free the mechanical, pneumatic, hydraulic or electrical actuation of the lifting equipment 4 for the raising of the vehicle 1. This lock is required for the reason that the lifting equipment 4 remains latched during normal travel operation and cannot be extended.

On actuation of the lifting equipment 4 into a position according to FIG. 4, it is effected that through the stroke actuation of the pivot arm pairs 81, 82 and 91, 92, the cable hooks 181 and 182 and thereby the ratchet cables 201 and 202 are moved along at the same time by way of deflecting rollers 191 and 192.

A wheel suspension with equipment for wheel suspension stroke limitation is reproduced in FIG. 6. Each of the cables 201 and 202 is firmly connected with a respective tension spring 33 and, beyond that, with a respective hook lever 26. Through the pulling movement of the ratchet cable 201 or 202, the respective lever 26, which is pivotably retained at the vehicle base, is brought into a detented position according to FIG. 6 against the a weaker restoring spring 28, which is retained at one end by a bracket 29. This means that the lever 26, by way of a hook 32 detents the wheel suspension or the rigid rear wheel axle 34, which is illustrated simplified in FIG. 6, before the turn-table 22 bears on the roadway.

Due to the preset load distribution of 60% to 80% on the turn-table 22 and the remaining load onto the front wheels 61 and 62, the partially relieved front wheels 61 and 62 remain in contact with the roadway only by the small weight component of 40% to 20%, whilst the rear wheels 71 and 72 lift off the roadway after a small stroke by reason of the reduced suspension travel caused by the stroke limitation equipment according to FIG. 6. With the vehicle motor and — through engagement of a forward gear — the front wheels 61 and 62 are now driven, the vehicle 1 endeavours to move forward correspondingly in direction of the fully turned steering. By reason of the large adhesion force of the turn-table 22 against the roadway on the one hand and the small adhesion force of the front wheels 61 and 62 to the roadway on the other hand, the front wheels 61 and 62 can indeed rotate, but a turning force component is thereby generated at the same time and suffices to turn the vehicle 1 about the lifting load point of the turn-table 22. It is thus possible at any time to bring the vehicle 1 at stand-still into a desired travel direction setting.

Figure 5:
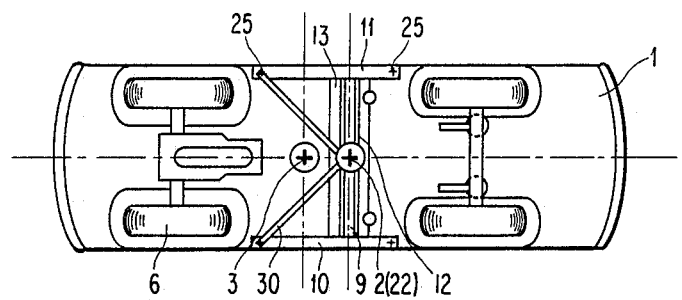

FIG. 5 shows the arrangement of a complete lifting equipment 4 with a view onto the vehicle base from below. In this case, an accessory set is preferably concerned, in which the longitudinal carriers 10 and 11 are fastened at the respective frame stiffenings 25, which are provided for the coupling-on of the accessory pack vehicle lifter.

In order that no harmful thrust forces can act on the lifting equipment 4 or be absorbed by this in the longitudinal axis of the vehicle during the turning of the vehicle 1, stays 30 must be provided, as is reproduced in the FIGS. 2 and 5, which stays connect the longitudinal carriers 10 and 11 with the bottom plate 21 in longitudinally stiff manner while however being movable in stroke.

It is self-evident that hydraulic or pneumatic cylinders can also come into use in place of the scissors arm pairs 81, 82 and 91, 92, for which it remains free to the constructor whether the pressure medium required for this is conveyed by means of manual or electrical pumps or is taken out of a present hydraulic circuit, for example from the steering hydraulic circuit.

The subject of the invention offers further advantages, for example as additional parking brake and at the same time as theft protection when the lifting equipment 4 is extended during parking of the vehicle so far that the turn-table 22 is braced against the roadway, whilst the wheels 61, 62, 71 and 72 however likewise remain in adhesion contact with the roadway.

The lifting equipment 4, which is shown in the FIGS. 2 to 5 and can also be used as augmenting equipment, can be reduced substantially in material effort and thereby in the cost expenditure when the appropriate stiffenings at the vehicle base or frame are taken into consideration from the start in the case of new vehicles.

We claim:

1. Lifting equipment for the turning on the spot of a four-wheeled motor vehicle with at least front-wheel drive, wherein the lifting equipment is provided with one of mechanical, pneumatic, hydraulic and electrical drive, is firmly mounted at an underside of the vehicle, and on actuation bears on the roadway such that two vehicle wheels are raised off from the roadway, characterised by: a supporting point (2) of the lifting equipment (4) being offset from the gravitational centre (3) and on the longitudinal center line of the vehicle such that, on actuation, the two rear wheels are raised off from the roadway and both front driving wheels are partially relieved with the lifting equipment bearing 60% to 80% of the vehicle weight and the partially relieved front wheels are loaded bearing the remaining vehicle weight, wherein the vehicle may then be turned about the support point by turning the front wheels and applying drive thereto.

2. Lifting equipment according to claim 1, wherein the lifting equipment comprises means for automatically switching on and off a lock of a front differential of the vehicle.

3. Lifting equipment according to claim 1, comprising two transverse carriers which are fastened to the underside of the vehicle and each comprise a laterally open right-angled profile member and two scissors arm pairs, which are mounted at their outer ends to be rollable within the transverse carriers by rotatable rollers and to be pivotable at the rollers, the inner ends of the scissor arm pairs being pivotably connected to a bottom plate.

4. Lifting equipment according to claim 1, comprising stroke-limiting equipment operable to reduce the suspension stroke of the wheels raised from the road surface, the stroke-limiting equipment being operable by the lifting equipment.

5. Lifting equipment according to claim 1, comprising stays for supporting the lifting equipment in the extended state against the vehicle.

6. Lifting equipment according to claim 1, comprising means for automatically latching and unlatching the lifting equipment by and only by a full turn of the front wheels.

7. Lifting equipment according to claim 6, said means for latching and unlatching of the lifting equipment comprising limit switches arranged at the vehicle steering linkage.

8. Lifting equipment according to claim 4, wherein the stroke-limiting equipment is actuable by the lifting equipment to reduce the suspension stroke of all wheels.

9. An apparatus for enabling a four-wheeled motor vehicle with at least front wheel drive to be turned about a support point, comprising: lifting jack means (9) fixed to an underside of the vehicle and including road engaging support point means (22) disposed on a longitudinal center line of the vehicle and rearwardly of a centre of gravity thereof a distance such that, upon actuation of the jack means to lift the rear wheels of the vehicle off of the road, 60% to 80% of the vehicle weight is borne by the jack means with the front wheels remaining in contact with the road but under a relieved load of 40% to 20% of the vehicle weight, such that the vehicle may be turned about the support point means by turning the front wheels and applying drive thereto.

* * * * *